United States Patent [19]

Davis

[11] 4,300,276

[45] Nov. 17, 1981

[54] FLEXIBLE PIPE INSERTER

[76] Inventor: Johnny L. Davis, 2600 Video St., Opelika, Ala. 36801

[21] Appl. No.: 124,286

[22] Filed: Feb. 25, 1980

[51] Int. Cl.³ .............................................. B23P 19/04
[52] U.S. Cl. ...................................... 29/234; 226/155
[58] Field of Search .......................... 29/234, 235, 237; 226/90, 154, 155

[56] References Cited

U.S. PATENT DOCUMENTS

| 2,228,139 | 1/1941 | Leonhardy | 29/234 |
| 3,095,130 | 6/1963 | Schultz | 226/155 |
| 3,371,770 | 3/1968 | Graham et al. | 226/155 |
| 3,523,392 | 8/1970 | Carl | 226/155 |
| 3,924,316 | 12/1975 | Matlock et al. | 29/234 |

FOREIGN PATENT DOCUMENTS

| 252560 | 5/1963 | Australia | 226/90 |
| 850589 | 9/1952 | Fed. Rep. of Germany | 29/234 |

Primary Examiner—James L. Jones, Jr.
Attorney, Agent, or Firm—Woodford R. Thompson, Jr.

[57] ABSTRACT

Apparatus for inserting a flexible plastic pipe into an old, larger size pipeline system. A lower roller assembly has at least one lower roller which engages and supports the flexible pipe adjacent the receiving end of the larger size pipe and an upper roller assembly has at least one upper roller which engages the upper surface of the flexible pipe opposite the lower roller. An actuator imparts relative movement between the upper and lower roller assemblies selectively toward and away from each other so that the upper and lower rollers are in driving engagement with the flexible pipe upon movement of the roller assemblies toward each other. A drive unit rotates the upper and lower rollers in a direction to push the flexible pipe into the larger size pipe while the rollers are in driving engagement with the flexible pipe.

3 Claims, 5 Drawing Figures

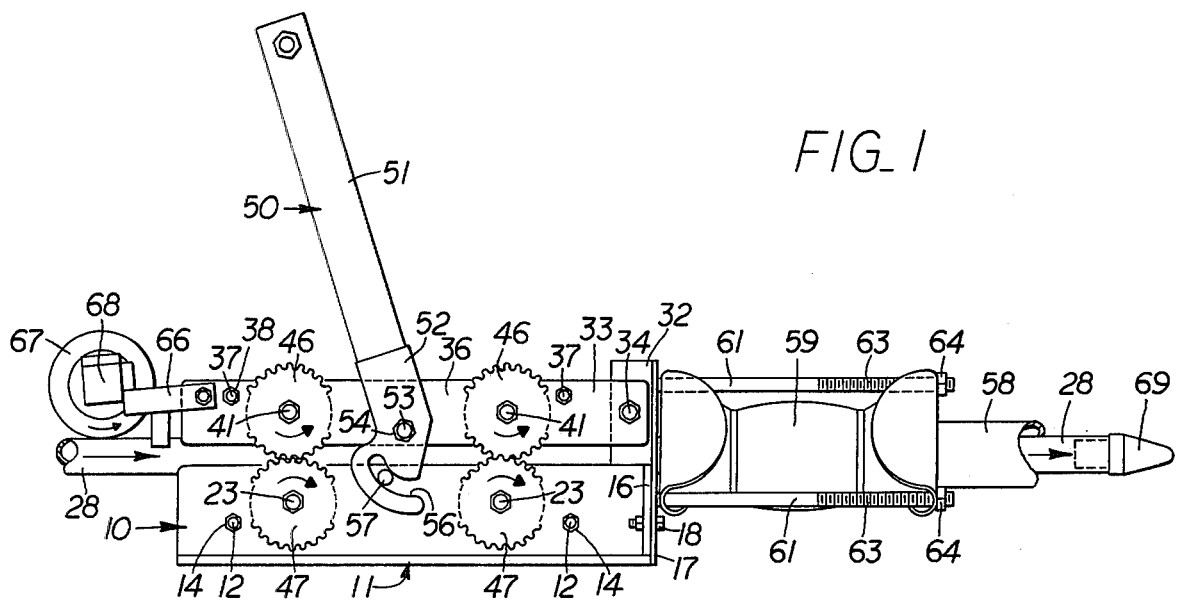
FIG_1
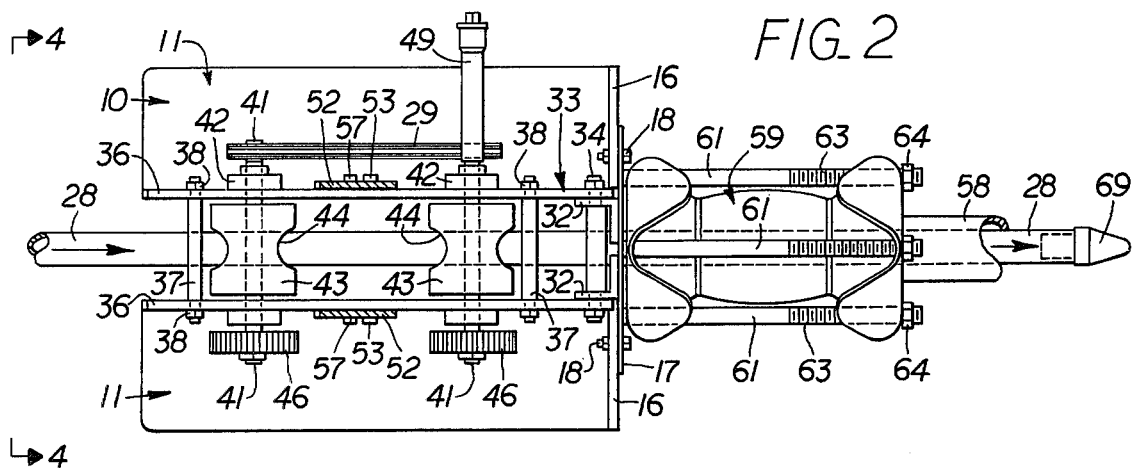
FIG_2
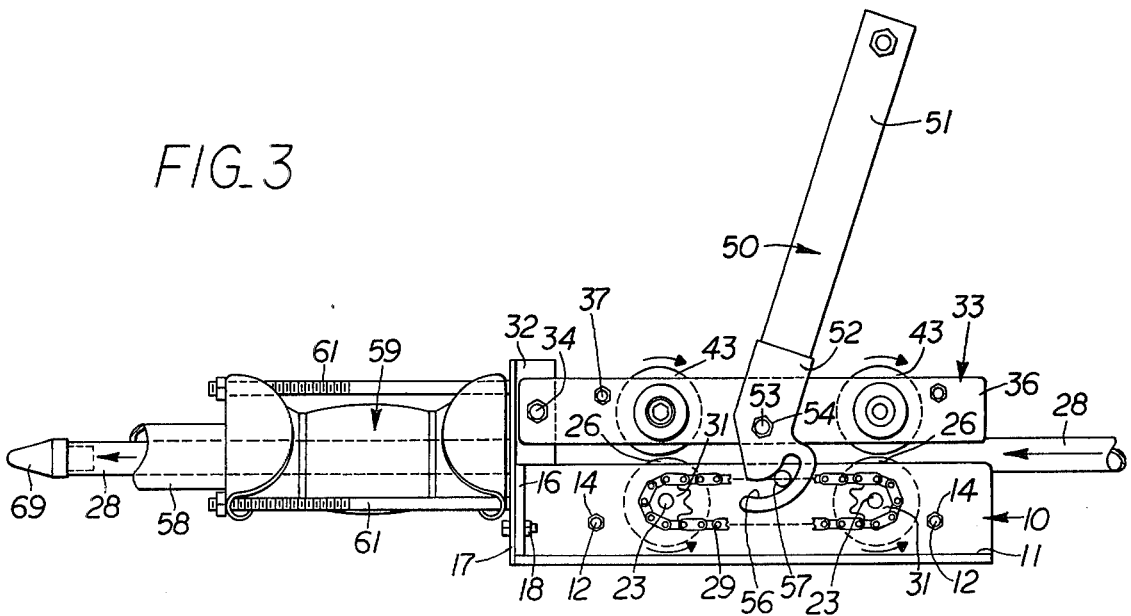
FIG_3

FLEXIBLE PIPE INSERTER

BACKGROUND OF THE INVENTION

This invention relates to a flexible pipe inserter and more particularly to apparatus for inserting a flexible pipe into an old, larger size pipeline system, such as systems employed to distribute natural gas and the like.

As is well known in the art to which my invention relates, many natural gas distribution companies are experiencing corrosion and leakage problems in their old cast iron pipeline systems. This is especially true due to the fact that most of such cast iron pipe is in the central business districts of towns and cities or areas of high population density. Since such gas mains are buried in streets with wide pavement and sidewalks and such mains are also in close contact with other underground untilities, it is very difficult and expensive to replace old cast iron mains with new mains.

It has become increasingly popular to replace old cast iron mains by inserting long sections of plastic pipe into the old pipe with such sections usually being block-long sections. This method of replacing old mains eliminates most of the ditch excavation normally required for new pipe burial. Also, the old cast iron serves as a casing to provide some protection for the plastic pipe from external hazards. Accordingly, the insertion of plastic pipe into old cast iron mains is considerably cheaper in high density areas than direct burial replacement. At the present time, most of the plastic pipe is inserted into smaller diameter cast iron pipelines ranging from approximately 2 inches to 6 inches in size. Since such small size plastic pipe is usually of the polyethylene type, it is relatively easy to handle due to the flexibility of such pipe. Also, since this type pipe is usually manufactured and sold in 500 foot coils, it is particularly adapted for insertion in an old cast iron pipeline.

Heretofore, it has been the normal procedure to use manual labor in the insertion of the plastic pipe into the old cast iron pipeline. This is not only a laborious and tiring method but it requires three men to accomplish a block-long insertion. In actual practice, I have found that the maximum length of 1¼ inch plastic pipe that can be inserted manually ranges from approximately 400 to 450 feet and also requires approximately 20 to 30 minutes.

SUMMARY OF THE INVENTION

In accordance with my invention, I provide an efficient and safe method for inserting flexible pipe into a larger size pipe which eliminates the very tiring task of manual insertion and at the same time requires fewer workers to accomplish the task. In actual practice, I have found that a 500 foot coil of 1¼ inch plastic pipe can be inserted in 8 to 9 minutes at an insertion rate ranging from approximately 55 to 60 feet per minute. My improved apparatus comprises a lower roller assembly, an upper roller assembly adapted for vertical adjustment relative to the lower roller assembly, an actuator unit adapted to impart relative movement between the lower roller assembly and the upper roller assembly, and means for coupling my improved apparatus to the larger size pipe which is to receive the smaller plastic pipe.

DESCRIPTION OF THE DRAWINGS

Apparatus embodying features of my invention is illustrated in the accompanying drawings, forming a part of this application, in which:

FIG. 1 is a side elevational view showing my improved apparatus connected to a pipeline by a conventional type compression coupling and showing a counter unit for measuring the length of the pipe inserted into a larger size pipe;

FIG. 2 is a top plan view of the apparatus shown in FIG. 1 with the counter unit being omitted for the sake of clarity;

FIG. 3 is a side elevational view showing the opposite side of the apparatus from that shown in FIG. 1 with the counter unit being omitted;

DETAILED DESCRIPTION

Figure 4:
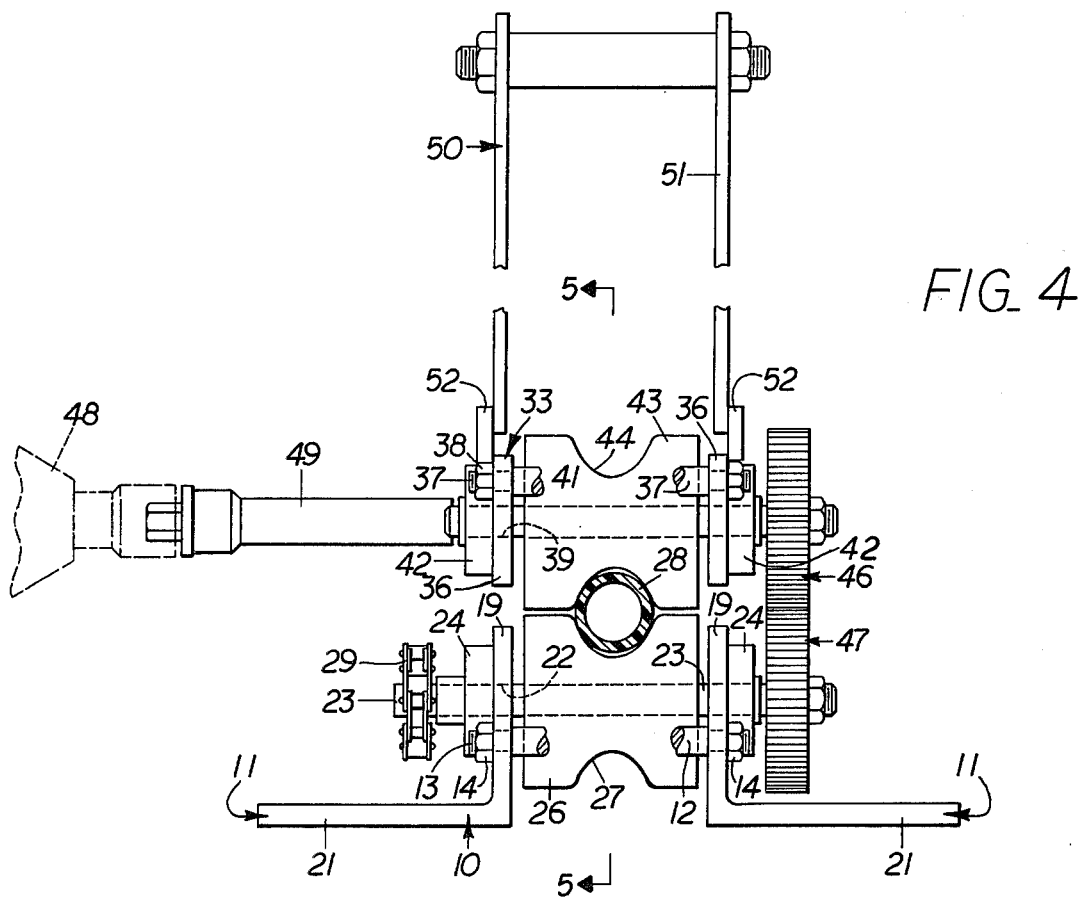
FIG. 4 is an and elevational view taken generally along the line 4—4 of FIG. 2 and drawn to a larger scale; and, FIG. 5 is a vertical sectional view taken generally along the line 5—5 of FIG. 4 with parts being broken away and in section.

Referring now to the drawings for a better understanding of my invention, I show a lower roller assembly 10 which may be in the form of a supporting frame comprising elongated angle members 11 which are connected to each other and held in spaced relation to each other by transverse connectors 12, as shown in FIGS. 3 and 4. The ends of the transverse connectors 12 are reduced in size and threaded as at 13 for receiving retaining nuts 14. A transverse plate 16 is secured to the forward and of each angle member 11 by suitable means, such as by welding. A transverse plate 17 extends across the forward ends of the angle members 11 and are secured to the forward sides of each transverse plate 16 by suitable means, such as retaining bolts 18. As clearly shown in FIG. 4, each angle member 11 is provided with a vertical leg 19 and a horizontal leg 21, with each horizontal leg 21 being adapted to engage a suitable supporting surface whereby the apparatus is supported therefrom.

Extending transversely through suitable openings 22 in the vertical legs 19 of the angle members 11 are a pair of longitudinally spaced shafts 23 which are mounted for rotation in suitable bearings 24, as shown in FIG. 4. Each shaft 23 carries a lower roller 26 formed of a suitable pipe gripping material such as rubber, which is provided with a centrally disposed, annular groove 27 which is adapted to engage and support a flexible pipe 28 formed of a conventional type plastic material such as polyethylene or the like. The lower rollers 26 are thus spaced from each other in the direction of movement of the flexible pipe 28 to be inserted into a larger size pipe. The lower rollers 26 are connected in driving relation with each other by a flexible drive chain 29 which passes around sprockets 31 mounted on the shafts 23, as shown in FIG. 3.

Secured to the foreward ends of the angle members 11 are upstanding angle brackets 32 which extend above the angle members 11 and alongside the transverse plates 16, as shown in FIG. 3. The forward end of an upper roller assembly 33 is pivotally connected to the upstanding angle brackets 32 by a transverse stud bolt 34. The upper roller assembly 33 comprises a pair of elongated, spaced apart members 36 which extend in vertical planes and in alignment with the vertical legs 19 of the subjacent angle members 11, as shown in FIG. 4. The elongated members 36 are secured rigidly to each other and in spaced relation to each other by transverse connector members 37 having retaining nuts 38.

Figure 5:
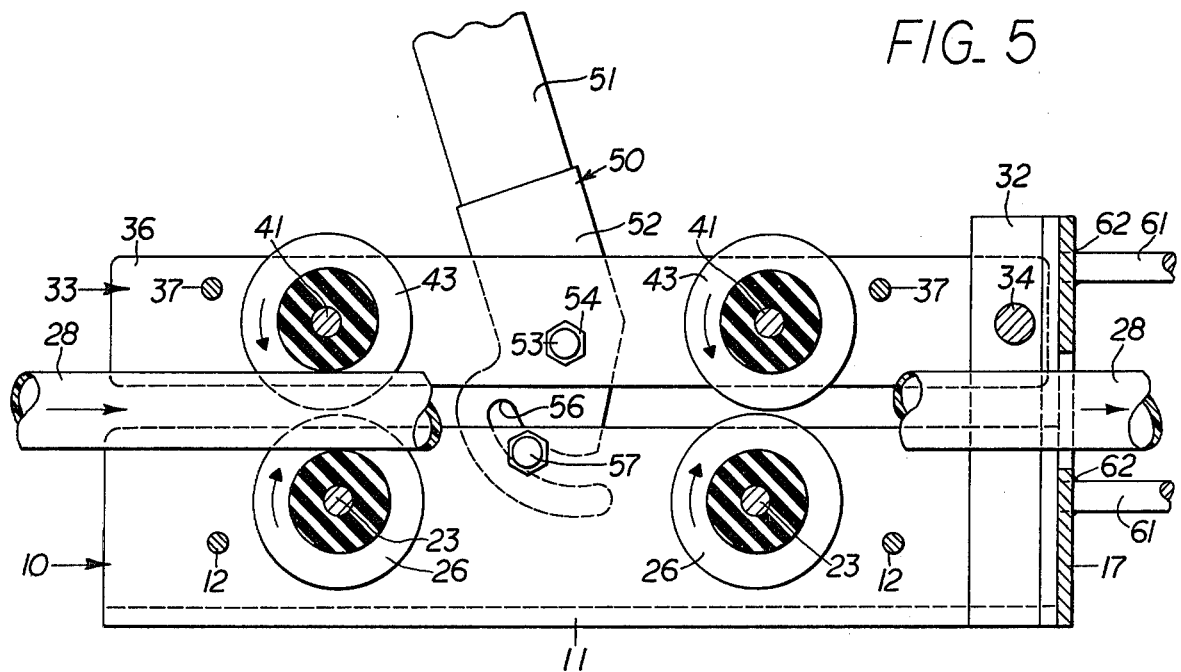

Extending through aligned openings 39 provided through the elongated members 36 of the upper roller assembly 33 are a pair of longitudinally spaced shafts 41 which are mounted for rotation in suitable bearings 42, as shown in FIGS. 2 and 4. Each shaft 41 carries an upper roller 43 formed of a suitable pipe gripping material such as rubber, which is provided with a centrally disposed, annular groove 44 which is adapted to engage the upper surface of the flexible pipe 28 opposite the lower roller 26, as shown in FIGS. 4 and 5.

Fixedly secured to one end of each of the shafts 41 at one side of the upper roller assembly 33 is a gear wheel 46 which is in position to mesh with a subjacent gear wheel 47 carried by the end of each shaft 23, as shown in FIG. 1. Rotary motion is imparted to one of the shafts 41 by means of a fluid pressure operated power unit 48 which is operatively connected to the shaft 41 by a suitable connector unit 49 which may be detachably connected to the shaft 41, as shown in FIG. 4.

To impart relative movement between the upper roller assembly 33 and the lower roller assembly 10 selectively toward and away from each other, I provide an actuator unit, indicated generally at 50. The actuator unit 50 comprises an elongated, upstanding lever arm 51 having depending, spaced apart legs 52, as shown in FIG. 4, which are adapted to extend along opposite sides of the upper roller assembly 33 and the lower roller assembly 10. The depending legs 52 are pivotally connected to the outer sides of the spaced apart members 36 of the upper roller assembly 33 by bolts 53 which are secured in place by nuts 54, as shown. Cooperating cam elements are carried by the depending legs 52 and by opposite sides of the lower roller assembly 10 and are adapted to engage each other in response to pivotal movement of the lever arm 51 to move the roller assemblies selectively toward and away from each other. As shown in FIGS. 1, 3 and 5, the cam elements carried by the depending legs 52 are shown as being in the form of cam grooves 56 which receive cam followers 57 carried by opposite sides of the lower roller assembly 10. Each cam follower 57 may be in the form of an outwardly projecting pin or roller which rides within the cam groove 56. Accordingly, upon movement of the lever arm 51 in a counterclockwise direction, as viewed in FIG. 1, the cam groove 56 engages the cam follower 57 and thus moves the upper roller assembly 33 downwardly toward the lower roller assembly 10. That is, since the forward end of the upper roller assembly 33 is pivotally connected by the pivot bolt 34 to the angle brackets 32 carried by the forward end of the lower roller assembly 10, the rear end of the upper roller assembly 33 is adapted to move selectively downwardly toward the lower roller assembly 10 and upwardly away from the lower roller assembly 10 in response to movement of the actuator unit 50 in opposite directions. It will thus be seen that upon movement of the upper roller assembly 33 downwardly toward the lower roller assembly 10, the upper rollers 43 are moved into driving engagement with the flexible pipe 28. The rear end of the upper roller assembly 33 is thus movable selectively to an upper inoperative position for insertion of the flexible pipe 28 between the upper rollers 43 and the lower rollers 26 and to a lower operative position with the upper and lower rollers in driving engagement with the flexible pipe 28 being inserted.

The forward ends of the lower roller assembly 10 and the upper roller assembly 33 are detachably connected to the larger size pipe 58 into which the plastic pipe 28 is to be inserted by a suitable compression type coupling indicated generally at 59. The compression coupling 59 may be carried by suitable bolt-like members 61 which are rigidly secured to the forward side of the plate 17 by welding at 62. Each bolt-like member 61 is threaded as at 63 for receiving the usual nuts 64. In view of the fact that such compression type couplings for pipe lines are of a conventional type well known in the art to which my invention relates, no further description thereof is deemed necessary.

Mounted for pivotal movement adjacent the rear end of the upper roller assembly 33 is a vertically adjustable support bracket 66. Mounted for rotation on the support bracket 66 is a measuring wheel 67 which in turn is operatively connected to a conventional type counter unit 68. The measuring wheel 67 is adapted to engage the upper surface of the flexible pipe 28 as it is inserted into the pipe 58 to thus measure the length of flexible pipe inserted. Also, as shown in FIGS. 1, 2 and 3, the leading end of the flexible conduit 28 if provided with a metal nose cone 69 which facilitates movement of the conduit 28 through the larger size pipe 58 in the usual manner.

From the foregoing description, the operation of my improved apparatus for inserting a flexible pipe into a larger size pipe will be readily understood. An excavation is made to prepare a tail ditch of approximately 5 feet in length at the desired site for insertion. The cast iron pipe or main 58 is taken out of service and a section approximately four feet in length is cut out of the cast iron pipe. The end of the pipe 58 is also reamed prior to connecting the compression coupling 59 thereto. The nuts 64 are then tightened on the compression coupling 59 to thus attach my improved pipe inserter to the old cast iron main 58. Blocks of wood, cement or the like are then placed beneath the lower roller assembly 10 to provide a stable and level base for the apparatus. A coil reel carried by a suitable vehicle is then placed into close proximity to the tail ditch whereupon the coil end is unreeled and the metal nose cone 69 is placed on the end of the plastic tubing 28, as shown. The actuator unit 50 is moved in a clockwise direction as viewed in FIG. 1, to thus raise the upper roller assembly 33 relative to the lower roller assembly 10 and the pipe 28 is then placed onto the lower roller assembly and hand fed for several feet nto the cast iron main 58.

After insertion of the plastic pipe 28 into the main 58, the upper roller assembly 33 is then lowered whereby the upper rollers 43 move into driving engagement with the upper surface of pipe 28. It is very important that, at this point, the upper and lower gears 46 and 47, respectively, must mesh properly. At this time, the actuator unit 50 is in an intermediate position with the gears in mesh with each other, but not in a fully lowered position. The power unit 48, such as a pneumatic motor, is then connected to the drive shaft 41 of an upper roller 43 through the connector unit 49. The measuring wheel 67 of the counter device is then lowered into engagement with the upper surface of the pipe 28. The pneumatic motor 48 is energized whereupon the plastic pipe 28 is then inserted into the cast iron main 58. In the event additional tension on the pipe 28 is required between the rollers 26 and 43, the actuator unit 50 is lowered additionally. However, at whatever position the actuator unit 50 is in, it will remain in that position without manually holding the actuator unit 50 during the insertion process. That is, the combined wedge action and frictional engagement between the cam follower 57 and the cam groove 56 tends to hold the actuator unit 50 at any selected position. Also, the weight of the upper end of the actuator unit 50 tends to urge the cam groove 56 in a direction for the cam follower 57 to move inwardly thereof while at the same time the gears 46 and 47 engage each other to thus limit downward movement of the upper roller assembly 33 relative to the lower roller assembly 10. After the flexible pipe 28 has been inserted into the larger size, cast iron pipe 58, the pneumatic motor 48 is deenergized and the actuator unit is rotated in a clockwise direction, as viewed in FIG. 5 whereupon the upper roller assembly 33 is raised. The flexible pipe 28 is then cut, if not at the coil end, whereupon the apparatus is then removed from the tail ditch.

From the foregoing, it will be seen that I have devised improved apparatus for inserting a flexible pipe into an old, larger size pipeline system. By providing power actuated means for continuously pushing the flexible pipe into the old, larger size pipe I not only eliminate the laborious and tiring process of inserting such pipe into an old main, but at the same time reduce the amount of labor required. Also, I greatly reduce the time required to insert the flexible pipe into the larger size pipe.

While I have shown my invention in but one form, it will be obvious to those skilled in the art that it is not so limited, but is susceptible of various changes and modifications without departing from the spirit thereof.

What I claim is:

1. Apparatus for inserting a flexible pipe into a larger size pipe comprising,
   (a) a lower roller assembly having at least one lower roller adapted to engage and support said flexible pipe adjacent the end of said larger size pipe into which said flexible pipe is to be inserted,
   (b) an upper roller assembly mounted above said lower roller assembly and having at least one upper roller adapted to engage the surface of said flexible pipe opposite said lower roller, an elongated upstanding lever arm having depending, spaced apart legs adapted to extend along opposite sides of said upper roller assembly and said lower roller asembly and pivotally connected to one of said roller assemblies,
   (d) cooperating cam elements carried by said depending legs and by opposite sides of at least one of said roller assemblies and adapted to engage each other in response to pivotal movement of said lever arm to move said roller assemblies selectively toward and away from each other so that upon movement of said upper roller assembly and said lower roller assembly toward each other said lower roller and said upper roller are moved into driving engagement with said flexible pipe, and
   (e) drive means for rotating said upper roller and said lower roller in a direction to push said flexible pipe into said larger size pipe while said lower roller an said upper roller are in driving engagement with said flexible pipe.

2. Apparatus for inserting a flexible pipe into a larger size pipe as defined in claim 1 in which said depending legs are pivotally connected to opposite sides of said upper roller assembly and said cooperating cam elements are carried by the lower ends of said depending legs and by said opposite sides of said lower roller assembly.

3. Apparatus for inserting a flexible pipe into a larger size pipe as defined in claim 2 in which said cam elements carried by said depending legs are cam grooves which receive cam followers carried by said opposite sides of said lower roller assembly.

* * * * *